(12) United States Patent
Bidkar

(10) Patent No.: US 11,327,788 B2
(45) Date of Patent: May 10, 2022

(54) METHODS FOR SCHEDULING MULTIPLE BATCHES OF CONCURRENT JOBS

(71) Applicant: JPMorgan Chase Bank, N.A., New York, NY (US)

(72) Inventor: Utkarsh Sudhir Bidkar, Maharashtra (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 404 days.

(21) Appl. No.: 16/454,827

(22) Filed: Jun. 27, 2019

(65) Prior Publication Data

US 2020/0012520 A1 Jan. 9, 2020

Related U.S. Application Data

(60) Provisional application No. 62/694,161, filed on Jul. 5, 2018.

(51) Int. Cl.
| | | |
|---|---|---|
| *G06F 9/46* | (2006.01) | |
| *G06F 9/48* | (2006.01) | |
| *G06F 9/38* | (2018.01) | |
| *G06F 11/30* | (2006.01) | |
| *G06F 3/0482* | (2013.01) | |
| *G06F 9/445* | (2018.01) | |

(52) U.S. Cl.
CPC .......... *G06F 9/4881* (2013.01); *G06F 3/0482* (2013.01); *G06F 9/3838* (2013.01); *G06F 9/44505* (2013.01); *G06F 11/3017* (2013.01)

(58) Field of Classification Search
CPC .... G06F 9/4881; G06F 3/0482; G06F 9/3838; G06F 9/44505; G06F 11/3017
See application file for complete search history.

(56) References Cited

U.S. PATENT DOCUMENTS

| | | | |
|---|---|---|---|
| 2010/0131620 A1* | 5/2010 | Kondamuru | G06F 9/5083 709/220 |
| 2010/0153952 A1* | 6/2010 | Linder | G06F 9/4881 718/101 |
| 2013/0275360 A1* | 10/2013 | Kharod | G06F 16/254 707/602 |

* cited by examiner

*Primary Examiner* — Wissam Rashid
(74) *Attorney, Agent, or Firm* — Greenblum & Bernstein, P.L.C.

(57) ABSTRACT

Exemplary embodiments include a method for scheduling multiple batches of concurrent jobs. The method includes: scheduling a plurality of batches where each batch has a plurality of jobs; identifying one or more dependencies via a configuration file, wherein the configuration file manages dependencies for each of the jobs of each batch; monitoring the one or more jobs; identifying and reporting one or more errors; and resolving the one or more errors by modifying one or more of hardware performance, CPU usage, memory consumption, database performance and/or other metrics to optimize system resource usage.

17 Claims, 5 Drawing Sheets

300

Fields:
- TYPE varchar(32)
- BATCH integer
- SEQ integer
- FLOWNAME varchar(256)
  - Nullable: No
- DAYOFWEEK integer
  - Nullable: No
  - Default: 0
- MODIFIEDDAYS integer
- NOOFRETRIES integer
- CLUSTERID integer
- STRAIGHTTHRU boolean
- CRITICAL boolean
- STATE varchar(32)
- SOR varchar(1024)
- TABLENAME varchar(256)
- ETLFLOWNAME varchar(5000)
  - Nullable: No
  - Default: 'NA'

Primary Index: FLOWCONFIG..PRIMARY_KEY on field: FLOWNAME

```
=============================Row #1=============================
TYPE: LEAF
BATCH: 1
SEQ: 4010
FLOWNAME: Job21
DAYOFWEEK: 0
MODIFIEDDAYS: 0
NOOFRETRIES: 1
CLUSTERID: 1
STRAIGHTTHRU: FALSE
CRITICAL: TRUE
STATE: Active
SOR: SOR1
TABLENAME: Table21
ETLFLOWNAME: Job11,Job12,Job13
=============================Row #2=============================
TYPE: LEAF
BATCH: 1
SEQ: 4020
FLOWNAME: Job22
DAYOFWEEK: 0
MODIFIEDDAYS: 0
NOOFRETRIES: 1
CLUSTERID: 1
STRAIGHTTHRU: TRUE
CRITICAL: FALSE
STATE: Active
SOR: SOR2
TABLENAME: Table22
ETLFLOWNAME: Job11
=============================Row #3=============================
TYPE: LEAF
BATCH: 1
SEQ: 4030
FLOWNAME: Job23
DAYOFWEEK: 0
MODIFIEDDAYS: 0
NOOFRETRIES: 1
CLUSTERID: 1
STRAIGHTTHRU: FALSE
CRITICAL: FALSE
STATE: Inactive
SOR: SOR3
TABLENAME: Table23
ETLFLOWNAME: Job13
=============================Row #4=============================
TYPE: LEAF
BATCH: 1
SEQ: 4040
FLOWNAME: Job24
DAYOFWEEK: 0
MODIFIEDDAYS: 0
NOOFRETRIES: 1
CLUSTERID: 1
STRAIGHTTHRU: FALSE
CRITICAL: TRUE
STATE: Active
SOR: SOR4
TABLENAME: Table24
ETLFLOWNAME: Job14
```

FIG. 5

METHODS FOR SCHEDULING MULTIPLE BATCHES OF CONCURRENT JOBS

CROSS-REFERENCE TO RELATED APPLICATIONS

The present invention claims priority to U.S. Provisional Application No. 62/694,161, filed Jul. 5, 2018, the contents of which are incorporated herein by reference in their entirety.

FIELD OF THE INVENTION

Exemplary embodiments generally relate to a method for scheduling multiple batches of jobs concurrently by resolving job dependencies.

BACKGROUND

In general, batch processing is used for efficient bulk database updates and automated transaction processing. The extract, transform and load (ETL) processing populates data warehouses. Batch applications are common and critical in most organizations. With current systems, if there are multiple batches that are required to be run, then due to dependency of one batch over other, processing takes a considerable amount of time and further requires manual review in tracking batch flows. As a result, current systems prolong the time to make the latest data available to end users.

These and other drawbacks exist.

SUMMARY OF EXEMPLARY EMBODIMENTS

According to one embodiment, a method schedules multiple batches of concurrent jobs. The method includes: scheduling a plurality of batches where each batch has a plurality of jobs; identifying one or more dependencies via a configuration file, wherein the configuration file manages dependencies for each of the jobs of each batch; monitoring the one or more jobs; identifying and reporting one or more errors; and resolving the one or more errors.

According to another embodiment, another method schedules batches of concurrent jobs. The method includes: scheduling a plurality of batches, wherein each batch has a plurality of jobs; identifying one or more dependencies via a configuration file, wherein the configuration file manages dependencies for each of the jobs of each batch of the plurality of batches and each of the jobs of the plurality of jobs in each of the batches has a dependency on a first job in each batch; executing a first job of a first batch of the plurality of batches; executing a first job of a second batch of the plurality of batches upon completion of the first job of the first batch such that the first job of the first batch and the first job of the second batch are executed in parallel and all subsequent jobs in the first batch and the second batch are executed in parallel; visually monitoring the one or more jobs through a user interface; identifying and reporting one or more errors; and resolving the one or more errors.

A system according to exemplary embodiments may include a specially programmed computer system comprising one or more computer processors, interactive interfaces, electronic storage devices, and networks.

The computer implemented system and method described herein provide unique advantages to entities, organizations and other users, according to various embodiments of the invention. The innovative method achieves improved utilization of resources by processing jobs in a parallel manner and managing dependencies via a configuration file. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3 is an exemplary illustration of a configuration file, according to an exemplary embodiment.

FIG. 5 is an exemplary illustration of sample entries of a configuration file, according to an exemplary embodiment.

DETAILED DESCRIPTION

The following description is intended to convey an understanding of exemplary embodiments by providing specific embodiments and details. It is understood, however, that various embodiments are not limited to these specific embodiments and details, which are exemplary only. It is further understood that one possessing ordinary skill in the art, in light of known systems and methods, would appreciate the use of various embodiments for its intended purposes and benefits in any number of alternative embodiments, depending upon specific design and other needs.

An embodiment is directed to initiating or kick-starting individual jobs the moment their dependencies are resolved. An exemplary application may involve a case where different batches are divided into a plurality of jobs. For example, the batches may be based on how a user wants to encapsulate and distribute quality control and validation information, on location, etc.

For example, the following batches may be processed.
batch1→job11, job12, job13, job14;
batch2→job21, job22, job23, job24; and
batch3→job31, job32, job33, job34.

Figure 1:
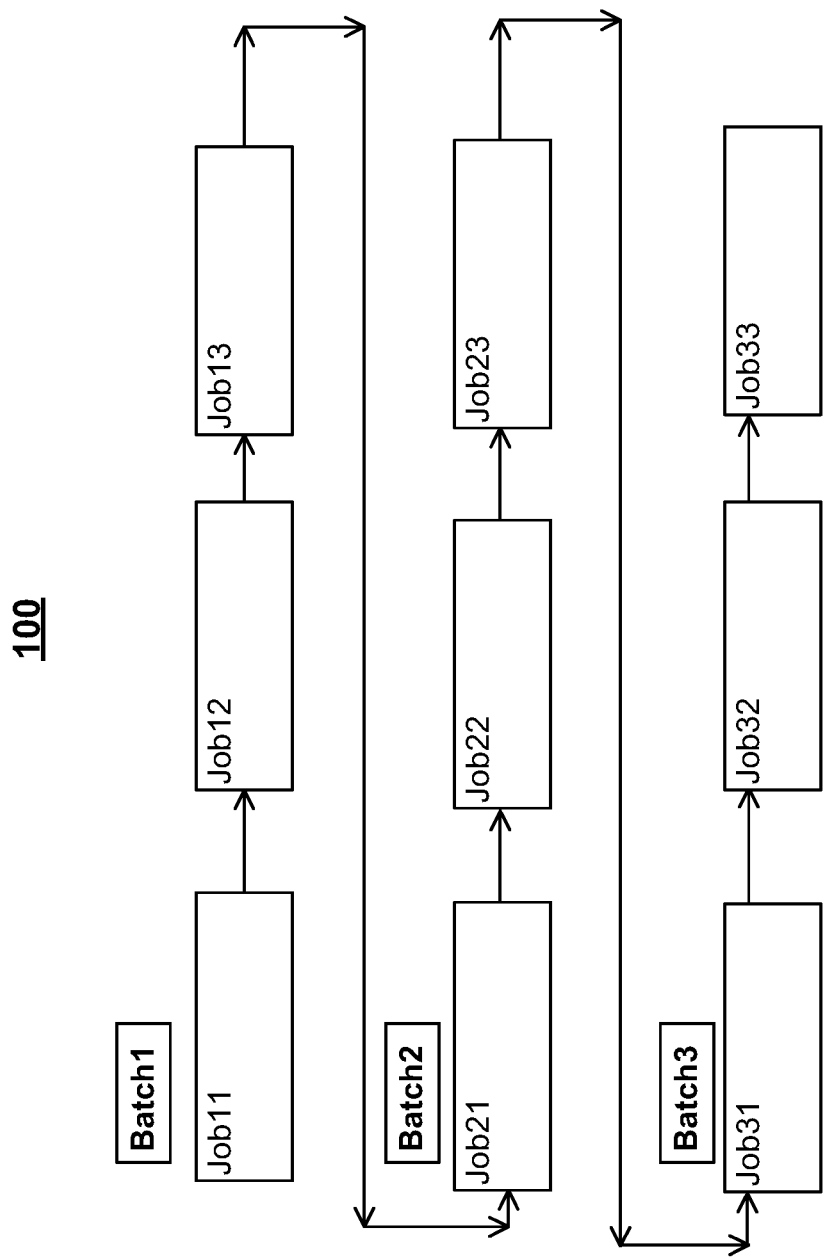
FIG. 1 is an exemplary illustration of a batch job processing according to an exemplary embodiment.

FIG. 1 is an exemplary illustration of a batch job processing. With current systems, a typical conventional flow 100 is as follows:
when batch1 completes→start batch2; and
when batch2 completes→start batch3.

As shown in FIG. 1, batch1 includes job11, job12 and job13. In this example, when an issue is experienced with a job, the next job is unable to be processed. This may occur with connectivity issues, sources not being made available, timing and time-out problems, etc. After each batch, a manual process is required to address any issues, confirm that each flow has been completed correctly and then initiate the next batch processing. Some flows may require additional time due to size of the load. Accordingly, as batches are delayed over time, the cumulative delay increases exponentially.

Figure 2:
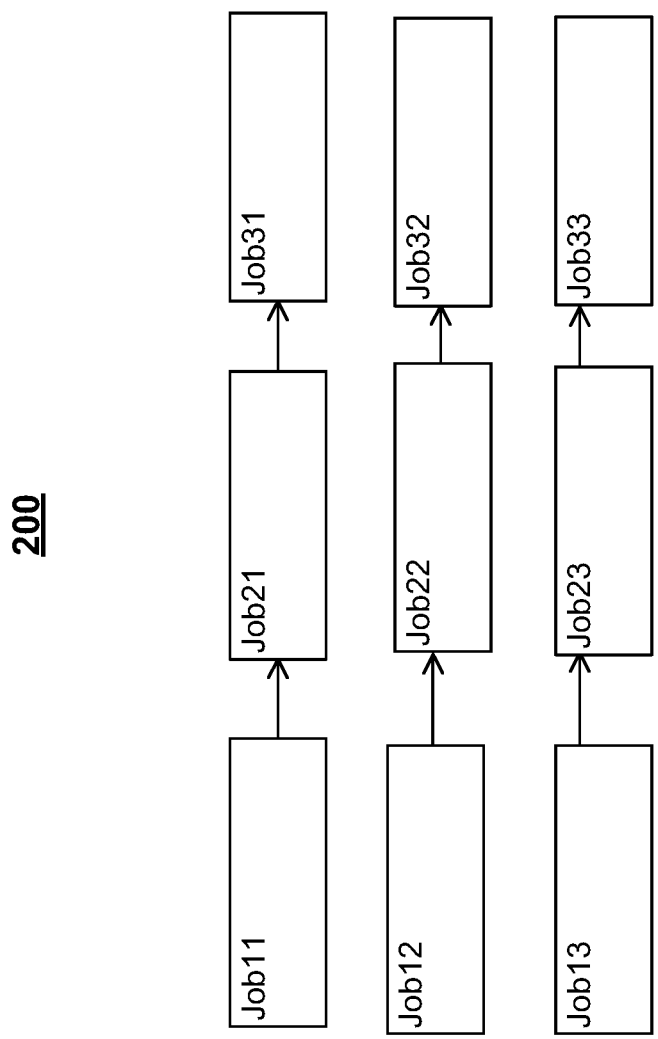
FIG. 2 is an exemplary illustration of a batch job processing, according to an exemplary embodiment.

FIG. 2 is an exemplary illustration of a batch job processing, according to an exemplary embodiment. The exemplary methodology 200 may involve the following:
when batch job11 completes→start job21;
when batch job21 completes→start job31;

when batch job12 completes→start job22;
when batch job22 completes→start job32;
when batch job13 completes→start job23; and
when batch job23 completes→start job33.

With the exemplary methodology, the jobs may be processed in an asynchronous manner. The dependencies of the jobs are managed and resolved through a configuration file.

FIG. 3 is an exemplary illustration of a configuration file 300, according to an exemplary embodiment. An exemplary embodiment is directed to managing the dependencies using a configuration file. Dependencies may be managed using database ("DB") entries. Other mechanisms may be used and may further depend on how the batch jobs are started. For example, an embodiment may run a daemon thread to continuously monitor a list of jobs (e.g., pinging at a pre-configured time, etc.) and start a next set of jobs. In this context, a daemon thread may run in background to perform tasks, such as pinging, for example.

The configuration file may represent a flowconfig table that provides details of each job or flow. For example, the flowconfig table may identify permissions, type of flow, frequency of execution (e.g., number of days that a job should be run), job size as well as other various control variables. The flowconfig table may also specify dependencies, e.g., batch jobs upon which the flow is dependent on as well as what flows are dependent on a particular job.

An exemplary embodiment may use the flowconfig table to perform optimization scheduling and further provide suggestions and/or modifications to current schedules. For example, an embodiment may execute queries on one or more flowconfig tables to ascertain dependencies to determine optimal scheduling. For example, with regard to job size, the system may run larger jobs at certain stages to avoid inefficiencies.

An exemplary embodiment may include a user interface where users may execute queries and visually monitor batch jobs in progress. The user interface may facilitate the ability to address and resolve errors and inefficiencies.

An exemplary embodiment may incorporate artificial intelligence (AI) as well as machine learning (ML) processing to analyze historical data and perform analytics. This processing may be applied to hardware performance, CPU usage, memory consumption, database performance and/or other metrics.

Figure 4:
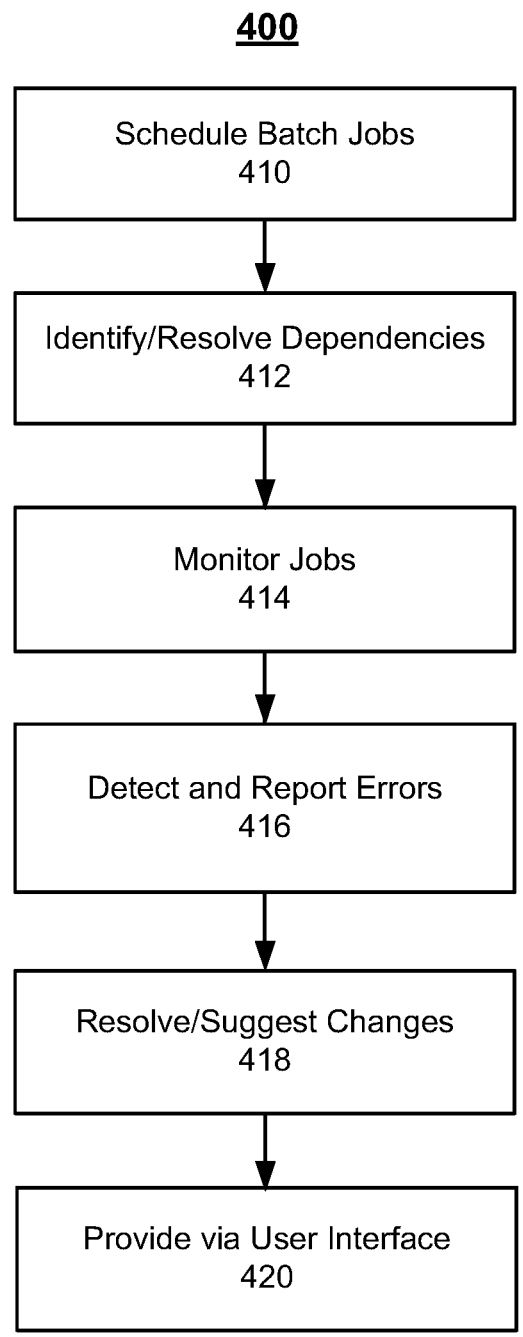
FIG. 4 is an exemplary flowchart of a method for scheduling multiple batch jobs, according to an embodiment.

FIG. 4 is an exemplary flowchart of a method 400 for scheduling multiple batch jobs, according to an exemplary embodiment. At step 410, one or more batch jobs may be scheduled. At step 412, dependencies may be identified and resolved by referring to a configuration file. At step 414, batch job processing may be monitored. At step 416, errors may be detected and resolved. At step 418, changes may be resolved to address the errors. At step 420, the system may provide results and processing details via a user interface.

The order illustrated in the method 400 is merely exemplary. While the method 400 illustrates certain steps performed in a particular order, it should be understood that the various embodiments may be practiced by adding one or more steps to the processes, omitting steps within the processes and/or altering the order in which one or more steps are performed.

An exemplary embodiment may be directed to a standalone comprehensive application for scheduling batch-jobs, resolving dependencies, reporting errors due to dependencies, artificial intelligence (AI) and/or machine learning (ML) to suggest solutions based on dependency errors, monitoring of jobs, alerting when they take more time than usual, AI and/or ML for determining possible reasons for taking more time, monitoring the hardware for CPU, memory consumptions, database performance, and/or other metric during batch runs and suggesting changes for concurrent running of different jobs to optimize system resources.

An exemplary embodiment may be directed to providing a graphical user interface to monitor and run specific jobs. The system may also implement authorization to provide permissions to run the jobs based on a role. The system may also provision to schedule only the sequence of jobs that are characterized as critical and need to be updated more often. An embodiment of the present invention may be directed to a platform agnostic system so that it may be run on any combination of OS, languages, scripts, etc.

FIG. 5 is an exemplary illustration of sample entries of a configuration file 500, according to an exemplary embodiment.

The foregoing examples show the various embodiments in one physical configuration. However, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in the various embodiments may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

In the system and method of exemplary embodiments, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments have been described herein in the context of a particular implementation in a particular environment for a particular purpose, those skilled in the art will recognize that its usefulness is not limited thereto and that the embodiments can be beneficially implemented in other related environments for similar purposes.

What is claimed is:

1. A method, comprising:
   scheduling a plurality of batches, wherein each batch has a plurality of jobs;
   identifying one or more dependencies via a configuration file, wherein the configuration file manages dependencies for each of the jobs of each batch;
   executing a first job of a first batch of the plurality of batches;
   executing a first job of a second batch of the plurality of batches upon completion of the first job of the first batch;
   executing a first job of a third batch of the plurality of batches upon completion of the first job of the second batch, and executing all subsequent remaining jobs in each of the plurality of batches in parallel, following completion of execution of the first job in each batch;
   monitoring the one or more jobs;
   identifying and reporting one or more errors; and
   resolving the one or more errors.

2. The method of claim 1, wherein the plurality of jobs are processed in an asynchronous manner.

3. The method of claim 1, wherein the configuration file comprises a flowconfig table that comprises details of each of the plurality of jobs.

4. The method of claim 3, wherein the flowconfig table specifies dependencies for each batch.

5. The method of claim 3, wherein the details comprise one or more of:
   permissions, type of flow, frequency of execution, and job size.

6. The method of claim 1, wherein the plurality of batches comprise at least three batches.

7. The method of claim 6, wherein each of the at least three batches comprises three or more jobs.

8. The method of claim 1, wherein each of the plurality of jobs in each batch of the plurality of batches has a dependency on a first job in that batch.

9. The method of claim 1, further comprising:
   executing a daemon thread in the background to perform one or more tasks.

10. The method of claim 9, wherein the one or more tasks comprise pinging.

11. The method of claim 1, further comprising:
    presenting a user interface comprising options for execution of queries and monitoring progress of batch execution.

12. The method of claim 1, wherein monitoring comprises visually monitoring through a user interface.

13. The method of claim 1, wherein resolving the one or more errors comprises modifying one or more of hardware performance, CPU usage, memory consumption, and database performance to optimize system resource usage.

14. A method, comprising:
    scheduling a plurality of batches, wherein each batch has a plurality of jobs;
    identifying one or more dependencies via a configuration file, wherein the configuration file manages dependencies for each of the jobs of each batch of the plurality of batches and each of the jobs of the plurality of jobs in each of the batches has a dependency on a first job in each that batch;
    executing a first job of a first batch of the plurality of batches;
    executing a first job of a second batch of the plurality of batches upon completion of the first job of the first batch and executing all subsequent jobs in each batch in parallel, following completion of execution of the first job in each batch;
    presenting a user interface comprising options for execution of queries and monitoring progress of batch execution
    visually monitoring the one or more jobs through the user interface;
    identifying and reporting one or more errors; and
    resolving the one or more errors by modifying one or more of hardware performance, CPU usage, memory consumption, and database performance to optimize system resource usage.

15. The method of claim 14, further comprising:
    executing a first job of a third batch of the plurality of batches upon completion of the first job of the second batch.

16. The method of claim 14, further comprising:
    executing a daemon thread in the background to perform one or more tasks.

17. The method of claim 14, wherein the configuration file comprises a flowconfig table that comprises details of each of the plurality of jobs and wherein the detail comprise one or more of: permissions, type of flow, frequency of execution, and job size, wherein the flowconfig table specifies dependencies for each batch.

* * * * *